(12) United States Patent
Nam

(10) Patent No.: US 10,006,230 B2
(45) Date of Patent: Jun. 26, 2018

(54) ACTUATOR INTEGRATED PUSH OPENER

(71) Applicant: HYUNDAI MOTOR COMPANY, Seoul (KR)

(72) Inventor: Kyung Hyun Nam, Jeollabuk-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 615 days.

(21) Appl. No.: 14/672,033

(22) Filed: Mar. 27, 2015

(65) Prior Publication Data

US 2016/0108648 A1    Apr. 21, 2016

(30) Foreign Application Priority Data

Oct. 17, 2014 (KR) .......................... 10-2014-0140720

(51) Int. Cl.
| | |
|---|---|
| *E05C 1/06* | (2006.01) |
| *E05B 83/34* | (2014.01) |
| *B60K 15/05* | (2006.01) |
| *E05B 81/06* | (2014.01) |
| *E05B 81/36* | (2014.01) |
| *E05B 17/00* | (2006.01) |
| *E05C 1/02* | (2006.01) |
| *E05C 3/06* | (2006.01) |
| *E05C 1/12* | (2006.01) |
| *E05C 19/00* | (2006.01) |

(52) U.S. Cl.
CPC .............. *E05B 83/34* (2013.01); *B60K 15/05* (2013.01); *E05B 17/0029* (2013.01); *E05B 17/0037* (2013.01); *E05B 81/06* (2013.01); *E05B 81/36* (2013.01); *B60K 2015/053* (2013.01); *B60K 2015/0576* (2013.01)

(58) Field of Classification Search
CPC ....................................................... E05B 83/34
USPC ........ 292/137, 142, 172, 138, 144, 201, 280
See application file for complete search history.

(56) References Cited

U.S. PATENT DOCUMENTS

| | | | | |
|---|---|---|---|---|
| 5,280,881 A | * | 1/1994 | Karmin | E05B 47/0012 292/142 |
| 5,307,656 A | * | 5/1994 | Gartner | E05L 337/08 70/277 |
| 5,592,838 A | * | 1/1997 | Clark | E05L 337/00 292/251.5 |

(Continued)

FOREIGN PATENT DOCUMENTS

| | | |
|---|---|---|
| CN | 202658979 U | 1/2013 |
| JP | 2001-065215 A | 3/2001 |

(Continued)

*Primary Examiner* — Kristina Fulton
*Assistant Examiner* — Faria Ahmad
(74) *Attorney, Agent, or Firm* — McDermott Will & Emery LLP

(57) ABSTRACT

An actuator integrated push opener includes a fuel inlet door of a vehicle to open and close a vehicle fuel inlet. A housing accommodates a motor having a worm mounted on a rotational shaft and has a guide hole formed. A striker is mounted in the housing, penetrates through the guide hole, and is connected to the fuel inlet door. A gear is mounted in the housing and engaged with the worm. A catch has an inserting protrusion which is inserted into a through-hole formed in the striker and mounted in the housing to rotate based on a rotation center of the gear. A gear spring is provided in the catch so that the catch constantly rotates in a direction toward the striker. A stopper is mounted to the gear to limit the rotation of the catch.

10 Claims, 5 Drawing Sheets

(56) References Cited

U.S. PATENT DOCUMENTS

| | | | |
|---|---|---|---|
| 6,318,771 B1* | 11/2001 | Holloway | B60K 15/05 292/201 |
| 6,739,633 B2 | 5/2004 | Holloway et al. | |
| 7,185,938 B2* | 3/2007 | Beck | B60K 15/04 292/207 |
| 8,398,127 B2* | 3/2013 | Persiani | B60K 15/05 292/137 |
| 9,139,085 B2* | 9/2015 | Frommann | B60K 15/05 |
| 2003/0222476 A1 | 12/2003 | Park | |
| 2007/0252394 A1* | 11/2007 | Moon | E05L 317/2092 292/201 |
| 2007/0273159 A1* | 11/2007 | Rouyer | F02K 1/766 292/201 |
| 2008/0073916 A1* | 3/2008 | Min | E05L 347/0603 292/201 |
| 2010/0045049 A1 | 2/2010 | Persiani et al. | |
| 2010/0270816 A1* | 10/2010 | Yuan | E05B 47/0012 292/201 |
| 2011/0174102 A1 | 7/2011 | Beck | |
| 2014/0084620 A1* | 3/2014 | Frommann | B60K 15/05 296/97.22 |
| 2015/0224872 A1* | 8/2015 | Frommann | B60K 15/05 296/97.22 |
| 2015/0330483 A1* | 11/2015 | Yamagata | F16H 19/04 74/89.17 |
| 2015/0337569 A1* | 11/2015 | Lim | E05B 83/34 292/197 |

FOREIGN PATENT DOCUMENTS

| | | |
|---|---|---|
| JP | 2011-231555 A | 11/2011 |
| KR | 10-1998-0037837 U | 9/1998 |
| KR | 10-0488995 B1 | 5/2005 |
| KR | 10-2011-0090935 A | 8/2011 |
| KR | 10-1245173 B1 | 3/2013 |
| KR | 10-1260217 B1 | 5/2013 |
| KR | 10-1263609 B1 | 5/2013 |
| WO | 2008/059543 A1 | 5/2008 |

* cited by examiner

ACTUATOR INTEGRATED PUSH OPENER

CROSS-REFERENCE TO RELATED APPLICATION

This application is based on and claims the benefit of priority to Korean Patent Application No. 10-2014-0140720, filed on Oct. 17, 2014 in the Korean Intellectual Property Office, the disclosure of which is incorporated herein in its entirety by reference.

TECHNICAL FIELD

The present disclosure relates to an actuator integrated push opener, and more particularly, to an actuator integrated push opener for opening and closing an oil-hole provided in a vehicle.

BACKGROUND

In general, a fuel fill inlet is provided on a vehicle side panel and provided with a door for opening the fuel inlet at the time of refueling. Since self-refueling is practiced in North America and Europe, opening the fuel inlet by touching the door from outside is preferred rather than opening the fuel inlet from inside the vehicle by manipulating a button.

However, as illustrated in FIG. 1, according to opening the fuel inlet by touching the door from outside, a reaction part 1 operated in response to a touch and a locking part 2 locking the reaction part 1 so that the reaction part 1 is not operated by unintended external force are separately formed. The reaction part 1 and the locking part 2 have a complex structure limiting design of freedom, thereby increasing manufacturing cost such as material cost.

SUMMARY

The present disclosure has been made to solve the above-mentioned problems occurring in the prior art while advantages achieved by the prior art are maintained intact.

An aspect of the present inventive concept provides an actuator integrated push opener having a reaction part and a locking part associated with each other.

According to an exemplary embodiment of the present inventive concept, an actuator integrated push opener includes a fuel inlet door of a vehicle for opening and closing a fuel inlet of the vehicle. A housing accommodates a motor having a worm mounted on a rotational shaft and has a guide hole formed toward the fuel inlet door. A striker is mounted in the housing, penetrates through the guide hole, and is connected to the fuel inlet door so that a length of the striker varies by an external force applied to the fuel inlet door. A gear is mounted in the housing and engaged with the worm. A catch has an inserting protrusion inserted into a through-hole formed on the striker and be mounted in the housing to rotate based on a rotation center of the gear. A gear spring is provided in the catch so that the catch continuously rotates in a direction toward the striker. A stopper is mounted to the gear to limit the rotation of the catch.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
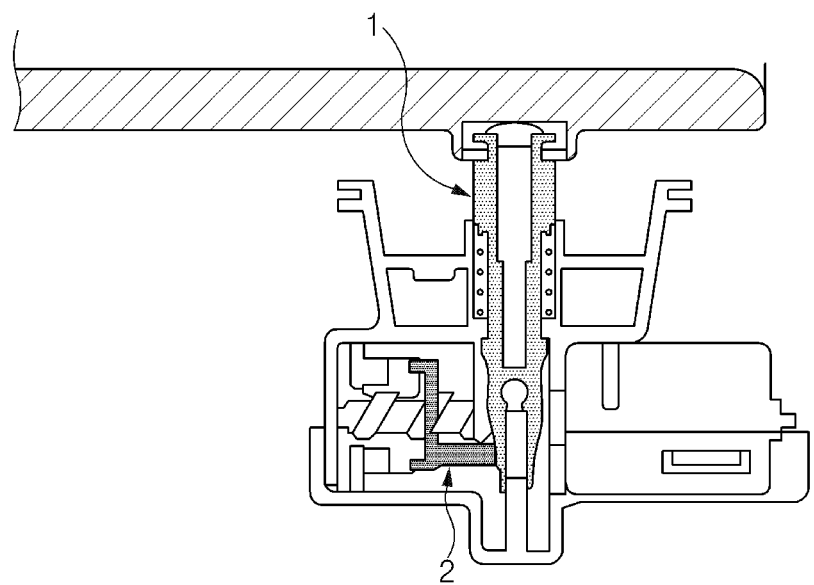
FIG. 1 is a cross-sectional view illustrating a push opener conventionally provided in a fuel inlet.
Figure 2:
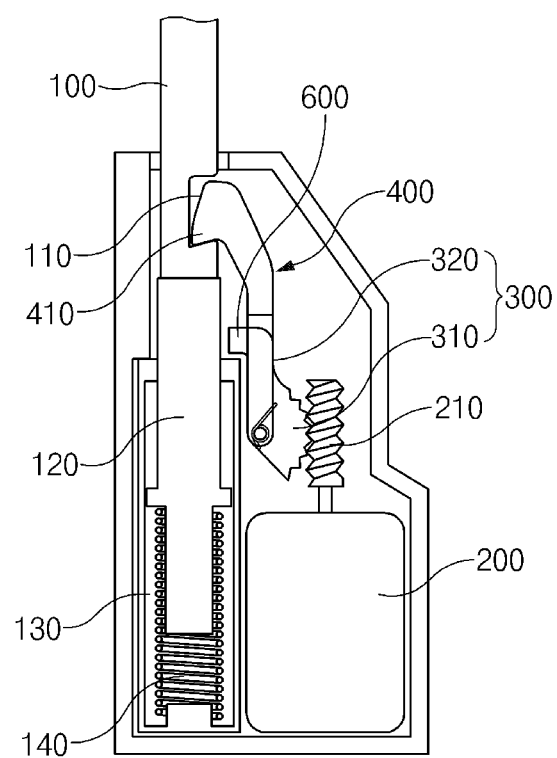
FIG. 2 is a perspective view of an actuator integrated push opener according to an exemplary embodiment of the present inventive concept.
Figure 3:
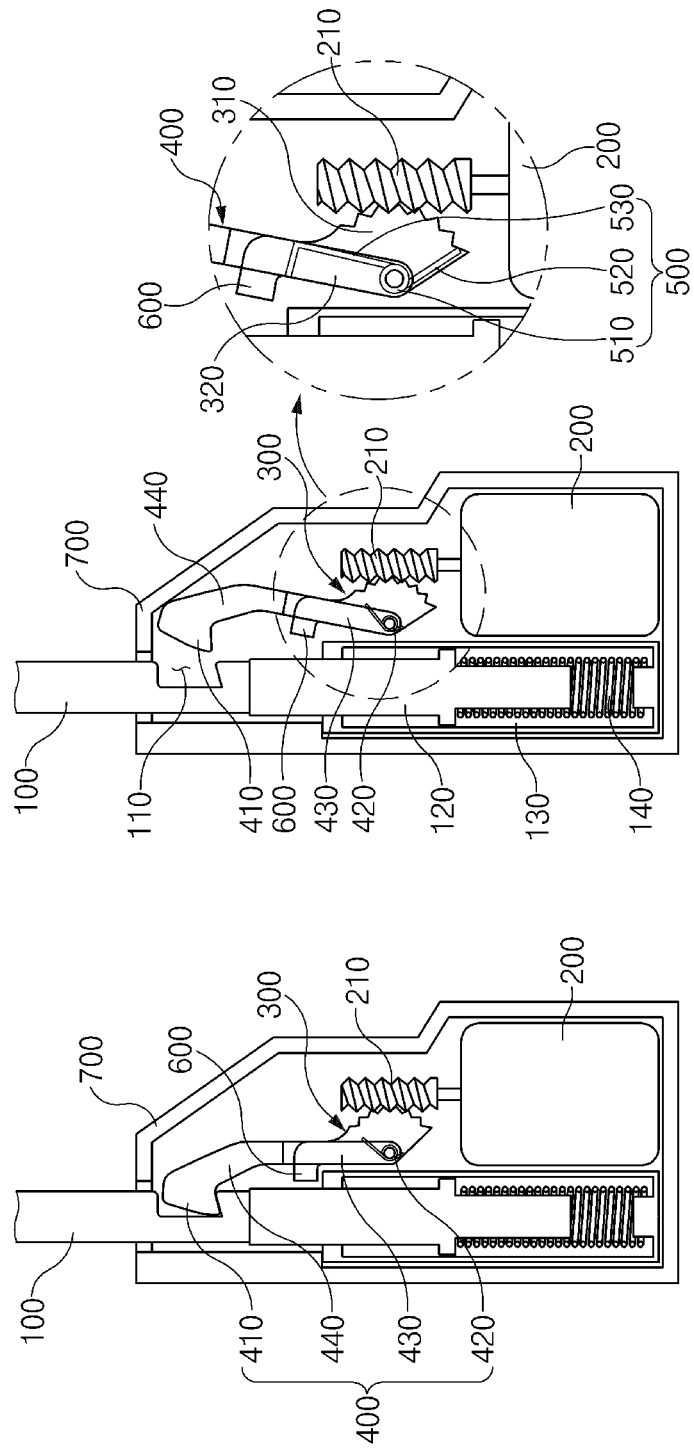
FIGS. 3A and 3B are state diagrams of a normal operation state of the actuator integrated push opener of FIG. 2.

Exemplary embodiments of the present inventive concept will be described in detail with reference to the accompanying drawings.

As illustrated in FIGS. 2 to 5, an actuator integrated push opener according to an exemplary embodiment of the present inventive concept includes a fuel inlet door D for opening and closing a fuel inlet of a vehicle. A housing 700 accommodates a motor 200 having a worm 210 mounted on a rotational shaft and includes a guide hole formed toward the fuel inlet door D. A striker 100, which is mounted in the housing 700, penetrates through the guide hole and is connected to the fuel inlet door D so that a length of the striker 100 is changed by external force applied to the fuel inlet door D. A gear 300 is mounted in the housing 700 and engaged with the worm 210. A catch 400 has an inserting protrusion 410 inserted into a through-hole 110 formed in the striker 100 and mounted in the housing 700 so as to be rotated based on a rotation center of the gear 300. A gear spring 500 is provided in the catch 400 so that the catch 400 always rotates in a direction toward the striker 100, and a stopper 600 is provided in the gear 300 to limit the rotation of the catch 400.

The striker 100 includes a piston 120 attached to a lower end of the striker 100, a cylinder 130 having the piston 120 embedded therein and positioned in the housing 700, and a spring 140 provided in the cylinder 130.

The gear 300 separates the catch 400 from the striker 100 by rotating the catch 400 in a reverse direction toward the housing 700. The gear 300 includes a rotational plate part 310 having a fan shape based on the rotation center of the gear 300 and having sawteeth engaged with the worm 210 at an arc thereof. A catch constraining part 320 extends along a radius of the rotational plate part 310 having the fan shape and has the stopper 600 protruding in a direction perpendicular to the rotational plate part 310. The stopper 600 protrudes in the direction perpendicular to the rotational plate part 310 from the catch constraining part 320 to be seated on an upper end of the cylinder 130 provided in the housing 700.

The catch 400 always rotates toward the striker 100 and is fastened to the through-hole 110 provided in the striker 100, thereby limiting movement of the striker 100. The catch 400 includes a fastening part 420 fastened to a hinge penetrating through the rotation center of the gear 300, a body part 430 extending from the fastening part 420 to be horizontal with the striker 100. An inserting part 440 which extends from the body part 430, is inclined toward the striker 100 at a predetermined angle and has the inserting protrusion 410 formed therefrom. The inserting protrusion 410 has a ring shape and is inclined toward a lower end portion of the striker 100 from the catch 400 at a predetermined angle.

The gear spring 500 presses the catch 400 so that the catch 400 always rotates in the direction toward the striker 100.

The gear spring 500 includes a core part 510 penetrating through the catch 400 and mounted on the hinge fixed to the housing 700, a gear fixing part 520 extending from the core part 510 and fixed to the gear 300, and a catch fixing part 530 extending from the core part 510 and fixed to the catch 400.

Since the motor 200, the gear 300, the catch 400, and the gear spring 500 perform a function of a locking part of the related art ("2" of FIG. 1) and the striker 100 performs a reaction part of the related art ("1" of FIG. 1), a configuration of the actuator integrated push opener is simple as compared to the related art.

As illustrated in FIGS. 3A and 3B, in the actuator integrated push opener according to the exemplary embodiment of the present inventive concept, fastening between the through-hole 110 and the inserting protrusion 410 is released by operating the motor 200 by a manipulation of a driver, and the striker 100 protrudes in a length direction of the actuator integrated push opener by pressing the striker 100, thereby opening the fuel inlet.

Subsequently, the striker 100 is compressed in the length direction by again pressing the striker 100, thereby the fuel inlet is maintained in a closed state. In this case, the motor 200 is operated and the through-hole 110 and the inserting protrusion 410 are fastened by the manipulation of the driver.

Figure 4:
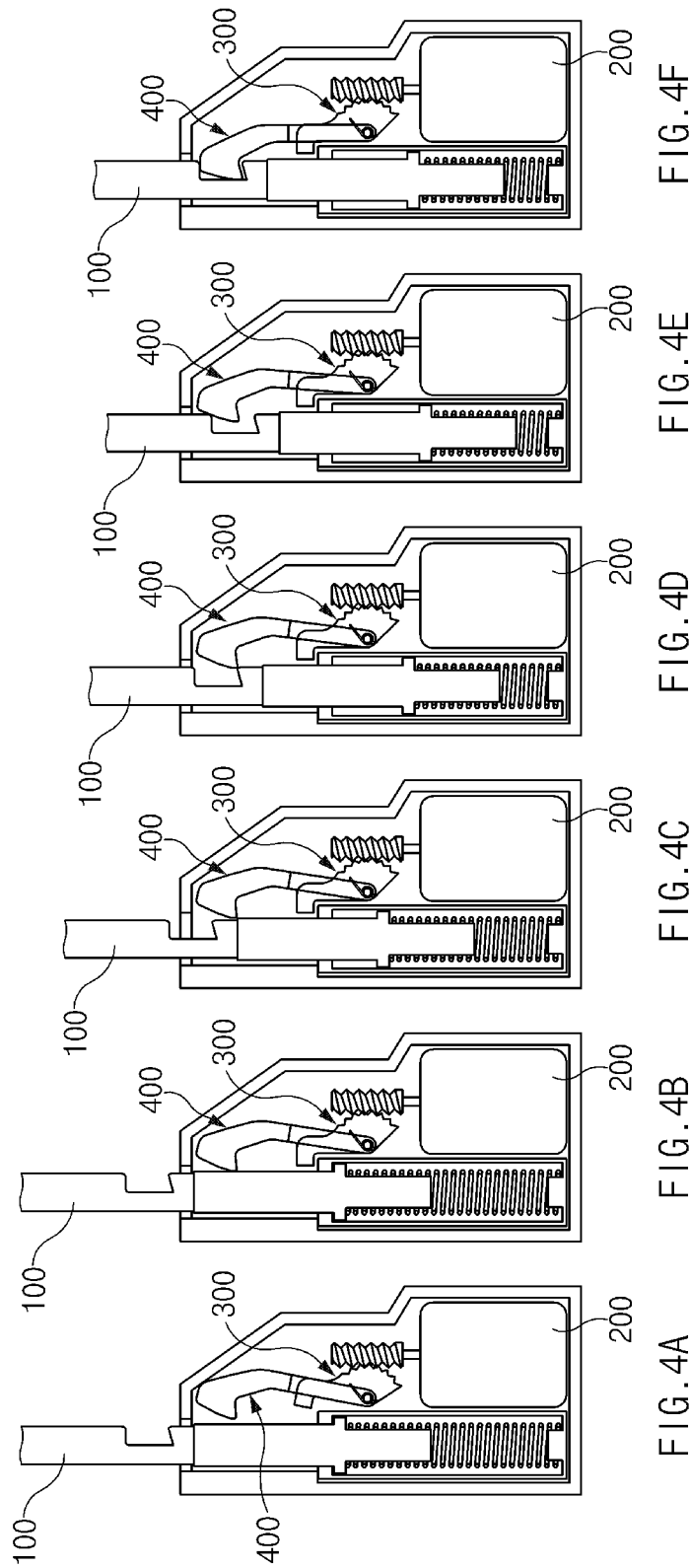
FIGS. 4A-4F are state diagrams of an abnormal operation state of the actuator integrated push opener of FIG. 2.
Figure 5:
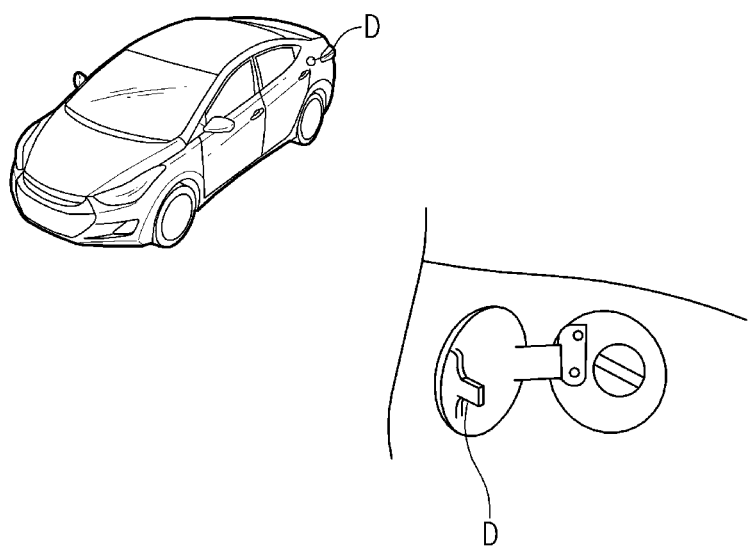
FIG. 5 is a perspective view of a vehicle mounted with the actuator integrated push opener of FIG. 2.

As illustrated in FIG. 4, even in the case in which the motor 200 is operated to fasten the through-hole 110 and the inserting protrusion 410 to each other by an intended manipulation of the driver or malfunction in a state in which the motor 200 releases the fastening between the through-hole 110 and the inserting protrusion 410 and the striker 100 protrudes in the length direction by pressing the striker 100, the striker 100 is compressed in the length direction by pressing the striker 100, thereby maintaining the closed state of the fuel inlet.

A detailed description thereof will be provided below. Even in the case in which the motor 200 is operated to fasten the through-hole 110 and the inserting protrusion 410 to each other, since the catch 400 is not constrained to the gear 300 and only rotates toward the striker 100 by the gear spring 500, the piston 120 provided at the lower end of the striker 100 and the inserting protrusion 410 are in contact with each other.

Subsequently, when the piston 120 descends into an inner side of the cylinder 130 as the striker 100 is pressed and the piston 120 ascends after passing a bottom dead center, the inserting protrusion 410 having a ring shape is hooked into the through-hole 110, such that the inserting protrusion 410 and the through-hole 110 are fastened.

That is, according to the related art, the fuel inlet door opened by the manipulation of the reaction part may not be closed after a locking apparatus is operated. However, according to the present disclosure, the opened fuel inlet door may be closed by the gear spring 500 and the catch 400 even after the motor 200 is operated.

As described above, according to the exemplary embodiment of the present inventive concept, since the actuator integrated push opener has the reaction part and the locking part formed to be associated with each other, the structure thereof can be simplified.

In addition, since the structure of the actuator integrated push opener is simplified, the design of the layout of the fuel inlet may be simple.

In addition, since the structure of the actuator integrated push opener is simplified, the material for forming the reaction part and the locking part is reduced, thereby making it possible to reduce the manufacturing cost.

In addition, since the catch always rotates toward the striker, the fuel inlet may be always closed as the opened fuel inlet door is pressed.

As described above, although the present inventive concept has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. An opening device of a fuel inlet door for a vehicle, the opening device comprising:
   a housing accommodating a motor having a worm mounted on a rotational shaft and have a guide hole formed toward the fuel inlet door;
   a striker mounted in the housing, the striker penetrating through the guide hole and connected to the fuel inlet door so that a length of the striker changes by an external force applied to the fuel inlet door;
   a gear mounted in the housing and engaged with the worm;
   a catch having an inserting protrusion which is inserted into a through-hole formed in the striker and mounted in the housing to rotate based on a rotation center of the gear;
   a gear spring provided in the catch so that the catch constantly rotates in a direction toward the striker; and
   a stopper mounted to the gear to limit the rotation of the catch,
   wherein the fuel inlet door opens and closes a fuel inlet of the vehicle, and
   wherein the gear spring includes:
      a core part penetrating through the catch and mounted on a hinge fixed to the housing;
      a gear fixing part extending from the core part and fixed to the gear; and
      a catch fixing part extending from the core part and fixed to the catch.

2. The opening device according to claim 1, wherein the striker includes:
   a piston attached to a lower end of the striker;
   a cylinder in which the piston is embedded and disposed in the housing; and
   a spring wound around the cylinder.

3. The opening device according to claim 1, wherein the gear includes:
   a rotational plate part having a fan shape and having sawteeth engaged with the worm at an arc of the rotational plate part; and
   a catch constraining part extending along a radius of the rotational plate part which has the fan shape,
   wherein the stopper protrudes in a direction perpendicular to the rotational plate part.

4. The opening device according to claim 3, wherein the stopper protrudes in the direction perpendicular to the rotational plate part from the catch constraining part to be seated on an upper end of a cylinder disposed inside the housing.

5. The opening device according to claim 1, wherein the catch includes:
   a fastening part fastened to a hinge penetrating through the rotation center of the gear;
   a body part extending from the fastening part to be horizontal with the striker; and an inserting part extending from a body and inclined toward the striker at a predetermined angle, the inserting part having the inserting protrusion formed therefrom.

6. The opening device according to claim 1, wherein the inserting protrusion has a ring shape which is inclined toward a lower end portion of the striker from the catch at a predetermined angle.

7. An opening device of a fuel inlet door for vehicle, the opening device comprising:
- a housing configured to have a guide hole formed toward the fuel inlet door;
- a striker mounted in the housing and penetrating through the guide hole, the striker connected to the fuel inlet door so that a length of the striker varies by an external force applied to the fuel inlet door;
- a catch continuously rotating toward the striker and fastened to a through-hole formed on the striker to limit a movement of the striker; and
- a gear separating the catch from the striker by rotating the catch in a reverse direction, wherein the fuel inlet door opens and closes a fuel inlet of the vehicle, wherein the striker includes:
- a piston attached to a lower end of the striker;
- a cylinder in which the piston is embedded and disposed in the housing; and
- a spring wound around the cylinder, and wherein the piston and the inserting protrusion contact each other.

8. The opening device according to claim 7, wherein the gear is connected to a motor provided in the housing.

9. The opening device according to claim 7, wherein the catch includes a gear spring which presses the catch so that the catch continuously rotates in a direction toward the striker.

10. The opening device according to claim 2, wherein the piston and the inserting protrusion contact each other.

* * * * *